United States Patent
Dornhaus et al.

(10) Patent No.: US 9,051,857 B2
(45) Date of Patent: Jun. 9, 2015

(54) DIESEL PARTICLE FILTER WITH IMPROVED BACK PRESSURE CHARACTERISTICS

(75) Inventors: Franz Dornhaus, Frankfurt am Main (DE); Stéphanie Frantz, Loerrach (DE); Gerald Jeske, Neuberg (DE)

(73) Assignee: UNICORE AG & CO. KG, Hanau-Wolfgang (DE)

( * ) Notice: Subject to any disclaimer, the term of this patent is extended or adjusted under 35 U.S.C. 154(b) by 703 days.

(21) Appl. No.: 13/127,326

(22) PCT Filed: Sep. 11, 2009

(86) PCT No.: PCT/EP2009/006618
§ 371 (c)(1),
(2), (4) Date: Jul. 14, 2011

(87) PCT Pub. No.: WO2010/051877
PCT Pub. Date: May 14, 2010

(65) Prior Publication Data
US 2012/0014842 A1    Jan. 19, 2012

(30) Foreign Application Priority Data
Nov. 4, 2008    (EP) .................................... 08168287

(51) Int. Cl.
*B01D 53/94*    (2006.01)
*B01D 53/92*    (2006.01)
(Continued)

(52) U.S. Cl.
CPC .......... *F01N 3/0222* (2013.01); *B01D 2279/30* (2013.01); *C04B 35/195* (2013.01);
(Continued)

(58) Field of Classification Search
USPC ............ 422/168, 177, 179, 180; 60/272, 273, 60/299
See application file for complete search history.

(56) References Cited

U.S. PATENT DOCUMENTS

| 4,749,671 A | 6/1988 | Saito et al. |
| 5,820,833 A | 10/1998 | Kawamura |

(Continued)

FOREIGN PATENT DOCUMENTS

| DE | 102 38 770 A1 | 3/2004 |
| DE | 103 23 607 A1 | 12/2004 |

(Continued)

OTHER PUBLICATIONS

International Search Report for PCT/EP2009/006618 mailed Dec. 21, 2009.

(Continued)

*Primary Examiner* — Walter D Griffin
*Assistant Examiner* — Jelitza Perez
(74) *Attorney, Agent, or Firm* — Smith, Gambrell & Russell, LLP (57) ABSTRACT

Proposed is a diesel particle filter which comprises a ceramic wall-flow filter substrate and a coating applied in the inflow ducts, which coating is composed of material with a high melting point. The coating (6) is provided such that, by means of said coating, pores (5), which connect the inflow ducts (1) and outflow ducts (2), in the wall (4) are closed off for the soot particles (7) at the inflow side without said coating thereby preventing the passage of the gaseous exhaust-gas constituents. The coating may be produced from one or more oxides with a high melting point or from fibrous material with a high melting point. In both cases, the coating has the effect that the depth filtration is considerably reduced, and therefore the back pressure increase encountered during the depth filtration phase is significantly reduced.

22 Claims, 6 Drawing Sheets

(51) Int. Cl.
*F01N 3/022* (2006.01)
*C04B 35/195* (2006.01)
*C04B 35/478* (2006.01)
*C04B 35/565* (2006.01)
*C04B 38/00* (2006.01)
*C04B 111/00* (2006.01)

(52) U.S. Cl.
CPC ............. *C04B35/478* (2013.01); *C04B 35/565* (2013.01); *C04B 38/0009* (2013.01); *C04B 2111/00793* (2013.01); *C04B 2111/0081* (2013.01); *F01N 2510/00* (2013.01); *F01N 2510/10* (2013.01); *Y02T 10/20* (2013.01)

(56) References Cited

U.S. PATENT DOCUMENTS

| | | |
|---|---|---|
| 7,229,597 B2 | 6/2007 | Patchett et al. |
| 7,264,785 B2 | 9/2007 | Blakeman et al. |
| 7,498,010 B2 | 3/2009 | Andreasson et al. |
| 7,763,222 B2 | 7/2010 | Miyairi et al. |
| 7,902,107 B2 | 3/2011 | Patchett et al. |
| 8,122,603 B2 | 2/2012 | Patchett et al. |
| 8,226,896 B2 | 7/2012 | Pfeifer et al. |
| 2004/0037754 A1 | 2/2004 | Van Setten et al. |
| 2004/0076565 A1 | 4/2004 | Gandhi et al. |
| 2005/0042151 A1* | 2/2005 | Alward et al. ............... 422/177 |
| 2005/0074374 A1 | 4/2005 | Ogura |
| 2005/0266992 A1 | 12/2005 | Ohno et al. |
| 2007/0065348 A1* | 3/2007 | Ohno et al. .................... 422/178 |
| 2007/0110650 A1* | 5/2007 | Pfeifer et al. .............. 423/213.5 |
| 2007/0137184 A1 | 6/2007 | Patchett et al. |
| 2010/0135866 A1 | 6/2010 | Mizuno et al. |
| 2010/0254862 A1 | 10/2010 | Sato et al. |
| 2011/0091361 A1 | 4/2011 | Reinsch et al. |
| 2011/0286903 A1 | 11/2011 | Andreasson et al. |
| 2012/0034133 A1 | 2/2012 | Patchett et al. |
| 2013/0004391 A1 | 1/2013 | Pfeifer et al. |

FOREIGN PATENT DOCUMENTS

| | | |
|---|---|---|
| DE | 10 2006 040739 | 3/2008 |
| DE | 10 2007 021 468 | 11/2008 |
| EP | 0 789 135 A1 | 8/1997 |
| EP | 1 054 722 A1 | 11/2000 |
| EP | 1 054 722 B1 | 12/2001 |
| EP | 1 437 491 A1 | 7/2004 |
| EP | 1 663 458 A1 | 6/2006 |
| EP | 1 837 494 A2 | 9/2007 |
| EP | 1 961 933 A1 | 8/2008 |
| EP | 1 633 458 B1 | 1/2009 |
| EP | 2 158 956 A1 | 3/2010 |
| EP | 2 168 662 A1 | 3/2010 |
| JP | 06-033734 | 2/1994 |
| JP | 09-173866 | 7/1997 |
| JP | 2002-320807 | 11/2002 |
| JP | 2007-144371 | 6/2007 |
| JP | 2009-106913 | 5/2009 |
| WO | 99/39809 | 8/1999 |
| WO | 2005/014146 A1 | 2/2005 |
| WO | 2005/016497 A1 | 2/2005 |
| WO | 2008/005337 | 1/2008 |

OTHER PUBLICATIONS

PCT Notification of Transmittal of Translation of the International Preliminary Examination Report (Form PCT/IB/338) mailed May 19, 2011 for Application No. PCT/EP2009/006618.

PCT International Preliminary Report on Patentability (Form PCT/IB/373) issued May 10, 2011 for Application No. PCT/EP2009/006618 (in English).

English translation of the PCT Written Opinion of the International Searching Authority (Form/ISA/237) issued May 4, 2011 for Application No. PCT/EP2009/006618.

"Literaturstudie zum Thema Partikelmesstechnik für Dieselmotoren schwerer Nutzfahrzeuge", 2004, p. 20. (see transmittal sheet for statement of relevance).

Melscoet-Chauvel et al., "High Porosity Cordierite Filter Development for NOx/PM reduction", Ceramic Engineering and Science Proceedings (2005), 26(8), pp. 11-19.

K. Ohno et al., "Characterization of High Porosity SiC-DPF", SAE Technical Papers, SAE 2002 World Congress.

Y. Mizuno et al., "Study on Wall Pore Structure for Next Generation Diesel Particulate Filter", SAE Technical Papers, SAE 2008 World Congress.

R-M. Heck et al., "Catalytic Air Pollution Control", Chapter 9, Diesel Catalyst Supports, John Wiley & Sons, 2002.

Kittelson David B., "Engine and Nanoparticles: A Review", Journal of Aerosol Science; vol. 29, No. 5/6, pp. 575-588, 1998.

R. Jones, Particle size analysis by lase diffraction, American Laboratory, Jan. 2003.

* cited by examiner

Figure 9

DIESEL PARTICLE FILTER WITH IMPROVED BACK PRESSURE CHARACTERISTICS

The invention relates to a diesel particle filter which has improved back pressure characteristics and which is suitable for removing diesel soot from the exhaust gas of diesel engines, in particular in vehicles.

The exhaust gas of motor vehicles operated by diesel engine contains not only the pollutant gases carbon monoxide (CO) and nitrogen oxides ($NO_x$) but also constituents arising from the incomplete combustion of the fuel in the combustion chamber of the cylinder. Aside from residual hydrocarbons, which are likewise present predominantly in gaseous form, these include particle emissions also referred to as "diesel soot" or "soot particles". These are complex agglomerates of predominantly carbon-containing solid matter particles and an adherent liquid phase usually consisting predominantly of relatively long-chain hydrocarbon condensates. The liquid phase which adheres to the solid constituents is also referred to as "soluble organic fraction SOF" or "volatile organic fraction VOF".

Figure 1:
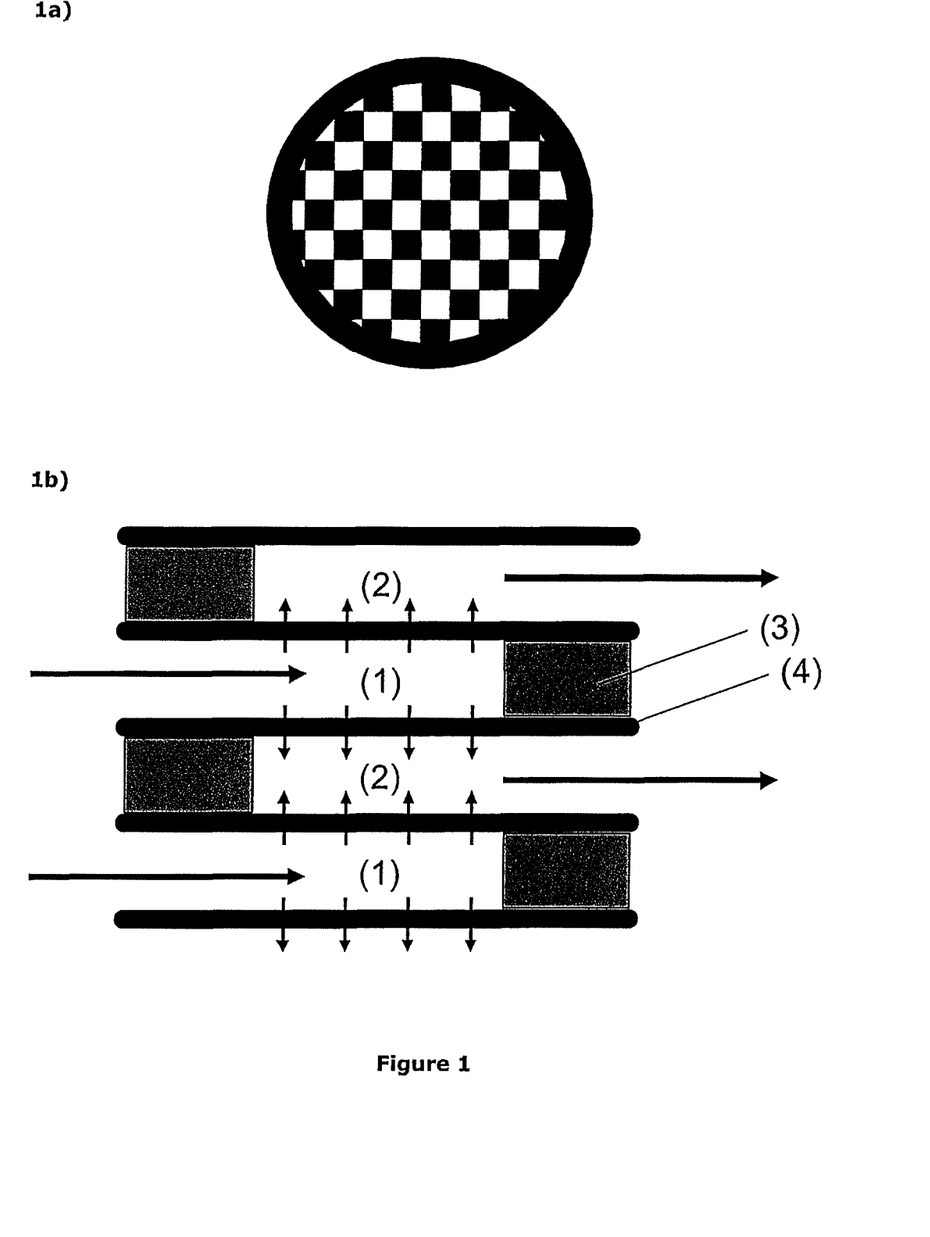
FIG. 1: is a schematic illustration of a wall-flow filter substrate.

To remove these particle emissions, use is made of particle filters. Against the background of the present fine dust problem, use is increasingly being made of ceramic wall-flow filter substrates which are characterized by high filter efficiency even with regard to small particles. Said wall-flow filter substrates are ceramic honeycomb bodies with inflow and outflow ducts alternatingly closed off in a gas-tight fashion. FIG. 1 schematically shows a wall-flow filter substrate of said type. The particle-containing exhaust gas flowing into the inflow ducts (1) is forced to pass through the porous wall (4) by the gas-tight closure plug (3) situated on the outlet side, and emerges from the wall-flow filter substrate again out of the outflow ducts (2) which are closed off on the inflow side. In the process, diesel soot is filtered out of the exhaust gas.

Figure 2:
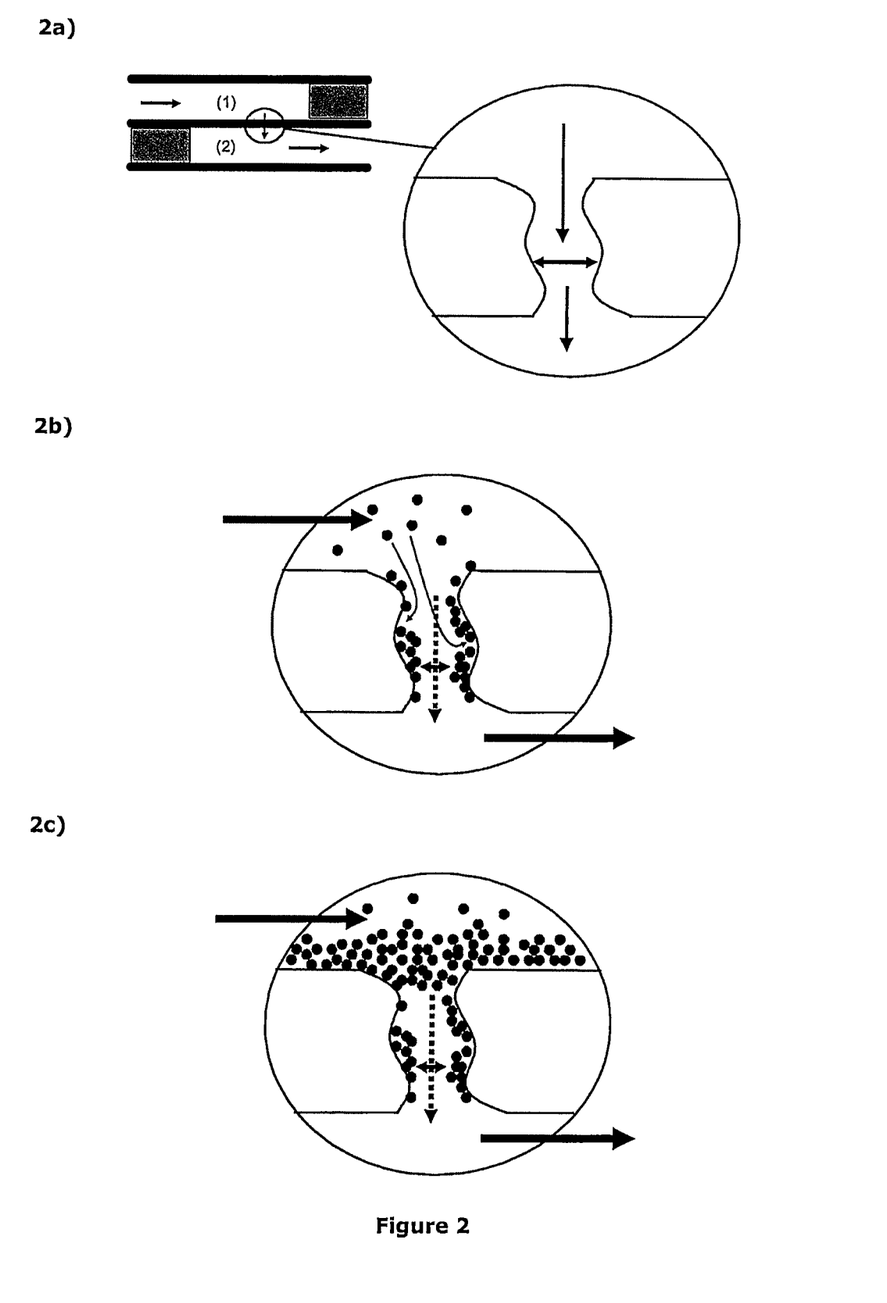
FIG. 2: is a schematic illustration of the soot filtration process in a wall-flow filter substrate; the following indications are used therein:
the arrows show the flow direction of the exhaust gas;
(1) inflow duct;
(2) outflow duct.
Figure 3:
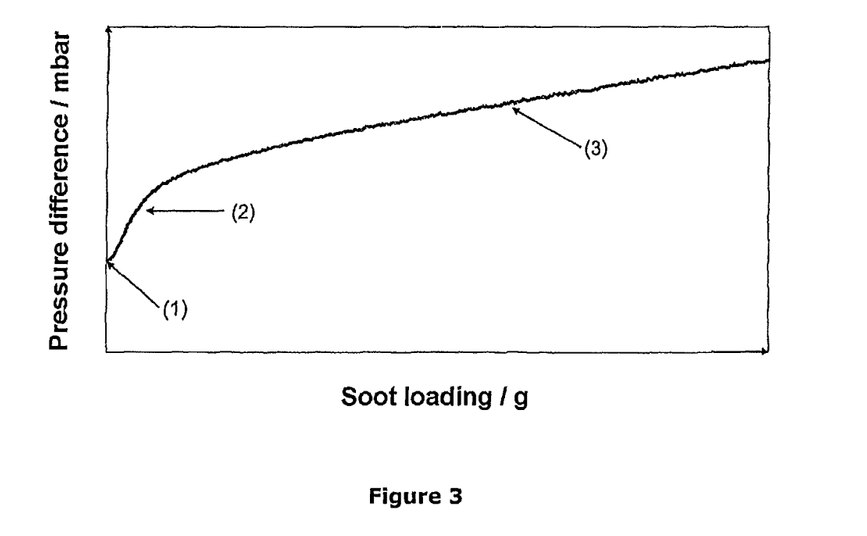
FIG. 3: is a schematic illustration of the development of the back pressure across a wall-flow filter substrate as a function of the accommodated soot quantity; the following indications are used therein:
(1) the initial back pressure in the soot-free state,
(2) the back pressure increase during the depth filtration phase;
(3) the back pressure increase during the filter cake formation phase.

The soot filtration in the wall-flow filter substrate as it passes through the wall can be described as a two-stage process. In a first phase, the so-called "depth filtration phase", as the particle-containing exhaust gas passes through the wall, soot particles adhere in the pores of the wall [FIG. 2*b*]. This leads to a reduction in the pore diameter in the wall, and as a result, to an abrupt increase in back pressure across the wall-flow filter substrate. When the pore diameter has decreased to too great an extent to allow medium-sized and relatively large soot particles to enter into the pores, filter cake formation [FIG. 2*c*] occurs in the entire inflow duct. As the filter cake builds up, the back pressure across the wall-flow filter substrate then increases only linearly with the filtered quantity of diesel soot. FIG. 3 schematically shows the development of the back pressure across the wall-flow filter, taking a soot-free filter as a starting point, as a function of the accommodated soot quantity. (1) shows the back pressure of the soot-free filter, (2) shows the increase during the depth filtration phase, and (3) shows the linear rise in back pressure during the filter cake formation phase.

Figure 4:
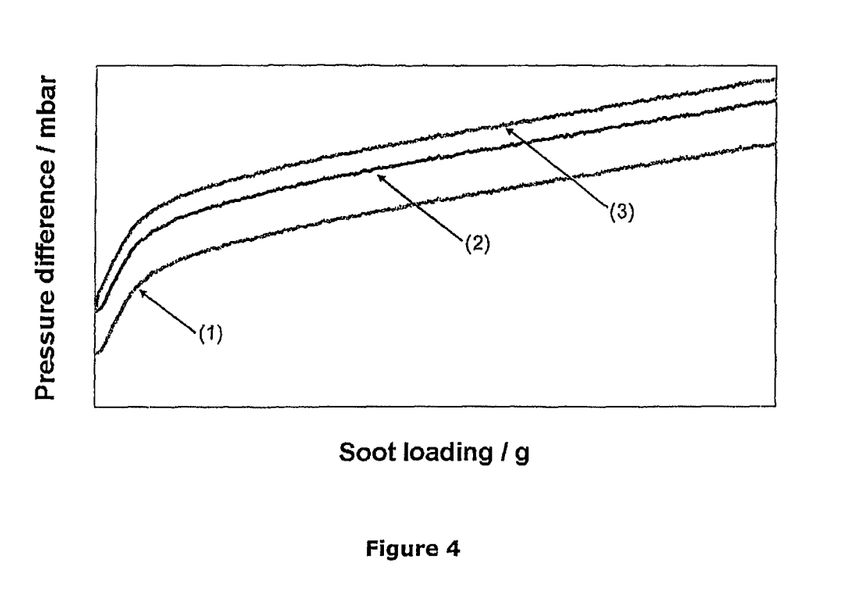
FIG. 4: is a schematic illustration of the development of the back pressure across different wall-flow filters as a function of the accommodated soot quantity; the following indications are used therein:
(1) the development of the back pressure across a non-coated wall-filter substrate,
(2) the development of the back pressure across a wall-flow filter substrate with catalytic coating or soot ignition coating;
(3) the development of the back pressure across a wall-flow filter substrate with a coating which has special structures for improving filtration efficiency.

The above described two-stage process of soot filtration in the wall-flow filter substrate applies generally; it is observed both in non-coated wall-flow filter substrates and also in wall-flow filter substrates with a catalytically active coating, with a soot ignition coating or with coatings which have special anchor structures for improving filtration efficiency. The initial configuration of the wall-flow filter influences predominantly the initial back pressure of the component in the soot-free state, as shown in FIG. 4. Catalytically coated wall-flow filter substrates or wall-flow filter substrates with a typical soot ignition coating (2) have a considerably higher initial back pressure in the soot-free state than non-coated wall-flow filter substrates (1); the profile of the back pressure curve with increasing soot loading is however similar to the profile of the back pressure curve of the non-coated substrate (1). A substrate having a coating (3) for increasing filtration efficiency generally has an initial back pressure in the soot-free state similar to the initial back pressure of catalytically coated wall-flow filters. The increase in the back pressure during the depth filtration phase is however considerably steeper because the pore radius narrows even more quickly on account of the purposely installed anchor structures.

In diesel particle filters used in motor vehicles, a high back pressure and a fast rise in back pressure are basically undesirable, because during operation, this has the result that engine power must be expended in order to force exhaust gas through the exhaust-gas purification system. Said engine power is then not available for driving the vehicle. The optimum utilization of the engine power for providing drive is however synonymous with an increase in the effective fuel utilization, and results in fuel consumption advantages and therefore also reduced $CO_2$ emissions of the vehicle.

It is an object of the present invention to provide a diesel particle filter which is characterized by improved back pressure characteristics without having reduced filtration efficiency or impaired catalytic characteristics or impaired soot ignition characteristics.

Figure 5:
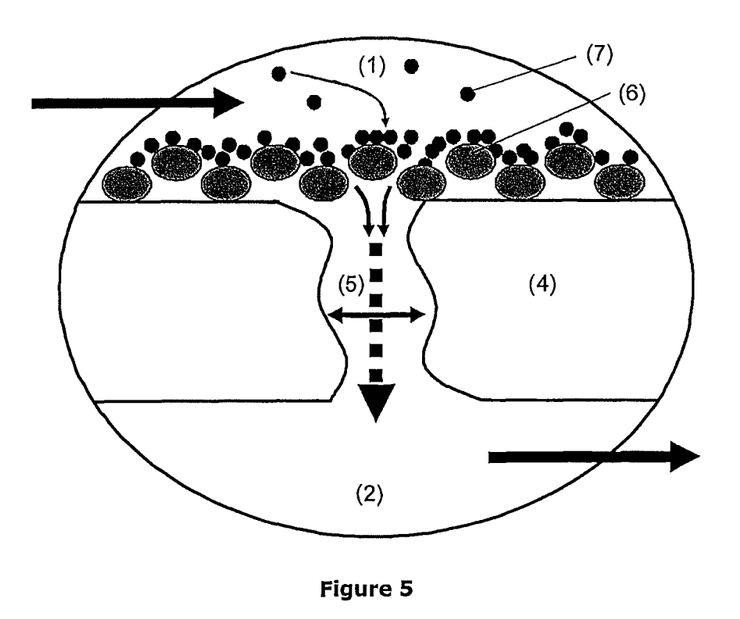
FIG. 5: is a schematic illustration of a detail of a diesel particle filter according to the invention comprising a ceramic wall-flow filter substrate and comprising a coating (6) applied in the inflow ducts (1), which coating is composed of material with a high melting point and is provided such that pores (5), which connect the inflow ducts (1) and the outflow ducts (2), in the wall (4) are closed off at the inflow side for soot particles (7) without said coating thereby preventing the passage of the gaseous exhaust-gas constituents.

Said object is achieved by means of a diesel particle filter comprising a ceramic wall-flow filter substrate and a coating applied in the inflow ducts, which coating is composed of material with a high melting point and is provided such that, by means of said coating, pores, which connect the inflow ducts and outflow ducts, in the wall are closed off for the soot particles at the inflow side without said coating thereby preventing the passage of the gaseous exhaust-gas constituents [FIG. 5].

This is achieved by means of a coating which predominantly contains one or more oxides which have a high melting point and the particle sizes of which are adapted to the pore sizes in the wall of the wall-flow filter substrate, in such a way that the $d_{50}$ value of the particle size distribution of the oxides is equal to or greater than the $d_5$ value of the pore size distribution of the wall-flow filter substrate, with the $d_{90}$ value of the particle size distribution of the oxides simultaneously being equal to or greater than the $d_{95}$ value of the pore size distribution of the wall-flow filter substrate. Here, the $d_{50}$ value and the $d_{90}$ value of the particle size distribution of the oxides should be understood to mean that 50% and 90% respectively of the total volume of the oxides contains only particles whose diameter is less than or equal to the value specified as $d_{50}$ and $d_{90}$ respectively. The $d_5$ value and the $d_{95}$ value of the pore size distribution of the wall-flow filter substrate should be understood to mean that 5% and 95% respectively of the total pore volume determinable by mercury porosimetry is formed by pores whose diameter is less than or equal to the value specified as $d_5$ and $d_{95}$ respectively.

The demanded functionality of the coating applied in the inflow ducts is provided even if the coating predominantly contains a fibrous material which has a high melting point and which lies in the form of a gas-permeable mat over the pore openings and thereby significantly hinders or at best substantially prevents the infiltration of even extremely fine soot particles into the pores. A suitable fibrous material should be selected such that the mean length of the fibres lies between 50 and 250 µm and the mean mass-based diameter of the fibres is equal to or less than the $d_{50}$ value of the pore size distribution of the wall-flow filter substrate, wherein the $d_{50}$ value of the pore size distribution of the wall-flow filter substrate should be understood to mean that 50% of the total pore volume determinable by mercury porosimetry is formed by pores whose diameter is less than or equal to the value specified as $d_{50}$.

Figure 6:
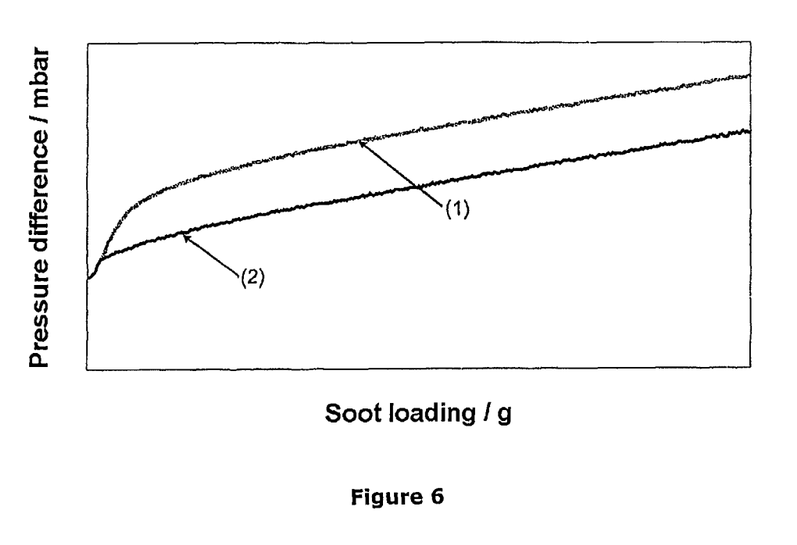
FIG. 6: is a schematic illustration of the development of the back pressure
(1) across a wall-flow filter substrate according to the prior art without a coating which reduces the depth filtration;
(2) across a wall-flow filter substrate according to the invention having a coating which reduces the depth filtration.

In both cases, the coating has the effect that the depth filtration is considerably reduced, and therefore the back pressure increase encountered during the depth filtration phase is significantly reduced. FIG. 6 schematically shows the effect obtained by means of the applied coating.

The concept of reducing back pressure by applying a coating, which reduces the depth filtration, in the inflow ducts may basically be applied to all wall-flow filter substrates. Preferred embodiments of the components according to the invention comprise wall-flow filter substrates which are produced from silicon carbide, cordierite or aluminium titanate and which have pores with a mean diameter of between 5 and 50 μm, preferably between 10 and 25 μm.

The most important embodiments according to the invention will be described in detail below. The coating according to the invention, the function of which is that of considerably reducing the depth filtration, is referred to hereinafter as "overcoat".

Claim 2 specifies a particle filter according to the invention having an overcoat comprising predominantly one or more oxides with a high melting point. In order that the overcoat is provided such that pores, which connect the inflow ducts and outflow ducts, in the wall are closed off for soot particles without said overcoat thereby preventing the passage of the gaseous exhaust-gas constituents, the materials used for the overcoat must be selected carefully. In particular, the oxides to be used must have a particle size distribution adapted to the pore size distribution in the wall of the substrate. Correct functioning of the overcoat is obtained if the $d_{50}$ value of the particle size distribution of the oxides is equal to or greater than the $d_5$ value of the pore size distribution of the wall-flow filter substrate, and at the same time, the $d_{90}$ value of the particle size distribution of the oxides is equal to or greater than the $d_{95}$ value of the pore size distribution of the wall-flow filter substrate (the meanings of the corresponding $d_x$ values firstly of the particle size distribution and secondly of the pore size distribution have already been explained above). Use is preferably made of oxides whose particle size distribution has a $d_{50}$ value of greater than or equal to 5 μm while having a $d_{90}$ value of greater than or equal to 20 μm. Oxides are particularly preferable which have a $d_{50}$ value of between 10 and 15 μm and a $d_{90}$ value which lies between 25 and 40 μm. Oxides are preferably used which have a $d_{50}$ value of 10 to 15 μm and a $d_{90}$ value of 30 to 35 μm. The latter are characterized not only by optimized functionality with regard to the reduction of the depth filtration but also by particularly good adhesion on the wall-flow filter substrate.

With some oxides, the required particle size ranges can be obtained in an effective manner by means of targeted pre-grinding of the oxide before it is introduced into the wall-flow filter substrate. To be able to comprehensively utilize this advantage, the oxides of the overcoat are preferably selected from the group consisting of aluminium oxide, rare earth metal-stabilized aluminium oxide, rare earth metal sesquioxide, titanium dioxide, zirconium oxide, cerium-zirconium mixed oxide, vanadium pentoxide, vanadium trioxide, tungsten trioxide, molybdenum trioxide, and mixtures thereof. The oxides are particularly preferably selected from the group consisting of aluminium oxide, rare earth metal-stabilized aluminium oxide, rare earth metal sesquioxide, zirconium oxide, and mixtures thereof.

Zeolite-based materials are generally not suitable as an oxidic overcoat, because the particle sizes of synthetic zeolites, usually with mean particle sizes of $d_{50}$<3 μm, lie far below the values required here.

To ensure optimum functioning of the oxidic overcoat while at the same time ensuring the coating which reduces the depth filtration has as little influence on the initial back pressure as possible, the overcoat is applied in the inflow ducts of the wall-flow filter substrate preferably with a layer thickness of 10 to 150 μm, particularly preferably 20 to 100 μm. For the above-specified selection of possible oxidic overcoat materials, it is possible to form corresponding layer thicknesses with a loading of 1 to 50 g/L solid matter in relation to the volume of the wall-flow filter substrate. Loadings with 1 to 20 g/L solid matter in relation to the volume of the wall-flow filter substrate are particularly preferable, and layer thicknesses with 1 to 10 g/L solid matter in relation to the volume of the wall-flow filter substrate are very particularly advantageous.

To produce a diesel particle filter according to the invention having an oxidic overcoat, a suitable oxide is selected and suspended in a quantity of water at least twice as great as the pore volume of the selected oxide. If appropriate, the aqueous suspension of the oxide thus obtained is ground by means of a Dyno mill until the required particle size distribution is obtained. The addition of additives to increase the sedimentation stability of the suspension at this stage of the production process is not detrimental to the function of the overcoat to be produced if said additives can be completely removed thermally during the calcination in the final preparation step. The admixture of adhesive agents such as silicic acid and other inorganic brines is also not detrimental and, in some embodiments, may possibly be advantageous. After the setting, which may be carried out if appropriate, of the particle size distribution by grinding, the suspension is pumped into the inflow ducts of the wall-flow filter substrate to be coated. After the inflow ducts are completely filled with the suspension, the excess suspension is sucked out of the wall-flow filter substrate again. Here, the suction power should be selected such that, at the end of the process, the predefined loading quantity of solid matter remains in the inflow duct. The coated wall-flow filter substrate produced in this way is dried in a flow of hot air at 80 to 180° C. and is subsequently calcinated at 250 to 600° C., preferably at 300 to 500° C. After calcination, said coated wall-flow filter substrate is ready for use without further treatment.

Claim 6 specifies a particle filter according to the invention having an overcoat predominantly containing a fibrous material with a high melting point. The fibrous material must be provided such that it lies in the inflow ducts in the form of a gas-permeable mat over the openings of the pores in the wall, and thereby significantly hinders or at best substantially prevents the infiltration of even extremely fine soot particles into the pores. To ensure this, the fibrous material must be selected such that the mean length of the fibres is between 50 and 250 μm and the mean mass-based diameter of the fibres is equal to or less than the $d_{50}$ value of the pore size distribution of the wall-flow filter substrate. The $d_{50}$ value of the pore size distribution of the wall-flow filter substrate should be understood to mean that 50% of the total pore volume determinable by mercury porosimetry is formed by pores whose diameter is less than or equal to the value specified as $d_{50}$. Use is preferably made of fibres with a mean fibre length of 100 to 150 μm, and a mean mass-based diameter of the fibre of 5 to 15 μm.

The fibrous material must be temperature-resistant, to such an extent that it can withstand the normal operational and regeneration temperatures of the diesel particle filter in the range from 100 to 800° C., that is to say the melting temperature of the fibres must lie above 800° C. Many fibrous materials which meet these technical requirements, such as for example asbestos, mullite, mineral wool with small fibre diameters and aluminium oxide fibres, release carcinogenic fibre dusts. The fibrous material used in the diesel particle filter according to the invention should therefore preferably be selected from the group of materials not harmful to health consisting of rockwool, natural stone fibre and mineral wool with fibre diameters of greater than 5 µm. Use is particularly preferably made of natural stone fibres. Such natural stone fibres consist predominantly of silicon dioxide, aluminium oxide, calcium oxide and magnesium oxide. Said natural stone fibres may also contain iron oxide and alkali oxides, in particular potassium oxide and sodium oxide. Suitable natural stone fibres are obtained for example from molten basalt. Said natural stone fibres are available in various forms as insulation materials from building material suppliers.

By using fibrous materials with a high melting point to produce the overcoat, it is possible to reduce the overcoat layer thicknesses in the component according to the invention to 1 to 50 µm. An overcoat composed of fibrous material with a high melting point preferably has a layer thickness of 3 to 30 µm. This can be achieved with an overcoat loading of 1 to 30 g/L solid matter in relation to the volume of the wall-flow filter substrate. Loadings of 2 to 15 g/L solid matter in relation to the volume of the wall-flow filter are particularly preferable, and loading quantities of 2 to 5 g/L solid matter in relation to the volume of the wall-flow filter substrate are very particularly advantageous.

A diesel particle filter according to the invention according to Claim 6 is produced by suspending the fibrous material in an adequate quantity of water and pumping the suspension through the wall-flow filter from the inflow side. Here, the quantity of suspension pumped into the substrate must be selected such that the quantity of fibrous material contained therein corresponds to the solid matter loading to be applied. To pump the aqueous suspension component through the wall, a correspondingly high pump pressure is required. If appropriate, the coating suspension may have added to it small quantities of adhesive additives if the particle sizes thereof are large enough that they remain in the spaces between the fibres and do not penetrate into the pores between the inflow and outflow ducts. If appropriate, silicic acid and other inorganic brines are considered as adhesive additives. After the coating suspension is pumped through, the wall-flow filter substrate is dried in a flow of hot air at 80 to 180° C. and is subsequently calcinated at 250 to 600° C., preferably at 300 to 500° C. After calcination, said wall-flow filter substrate is ready for use without further treatment.

In contrast to the production of a diesel particle filter according to the invention according to Claim 2, the coating suspension cannot be sucked out of the inflow ducts of the wall-flow filter during the production of the diesel particle filter according to the invention with a fibre overcoat, because the suction loading would cause the inserted fibre mat to be torn up, and pores to be exposed. The pores exposed in this way would continue to be accessible to soot particles; as a result, an increased degree of depth filtration would be encountered, and the potential for back pressure reduction would not be fully utilized.

It has already been mentioned that the concept of reducing back pressure by applying a coating (overcoat), which reduces the depth filtration, in the inflow ducts may basically be applied to all wall-flow filter substrates. These also include catalytically coated wall-flow filter substrates or wall-flow filter substrates with coatings which reduce the soot ignition temperature.

It is for example possible for overcoats composed of oxidic material with a high melting point or composed of fibrous material with a high melting point, as have been described above, to be applied to wall-flow filter substrates which have a catalytically active coating and/or a coating which reduces the soot ignition temperature provided predominantly in the pores of the wall between the inflow and outflow ducts. Such already-coated wall-flow filter substrates are preferably provided with an overcoat composed of fibrous material according to Claim 6, because said type of coating which reduces the depth filtration is particularly effective even with relatively thin layer thicknesses. The layer thicknesses of the oxidic overcoat according to Claim 2 which are preferable for optimum effectiveness of said oxidic overcoat can under some circumstances result in the initial back pressure of the soot-free part increasing to an extent greater than a back pressure reduction that could be obtained by a reduction of the depth filtration.

Depending on the vehicle application, it may also be advantageous for a diesel particle filter according to the invention having an overcoat to have applied to it an additional catalytically active coating and/or an additional coating which reduces the soot ignition temperature. Such an embodiment however has the basic disadvantage that the initial back pressure of the soot-free filter increases exorbitantly as a result of the arrangement of two layers on top of one another in the inflow ducts. Such embodiments are therefore used only for special vehicle applications in which fuel consumption is of secondary importance but for which, for example on account of lower average operating conditions, soot ignition is required at very low temperatures and/or a high level of continuous particle trap regeneration (CRT® effect) is required, for example for construction machines and other so-called "non road" applications.

Embodiments which are particularly well suited to many vehicle applications are obtained if, in a diesel particle filter according to the invention with an oxidic overcoat, the coating which reduces the depth filtration is catalytically activated.

As described above, the oxides of the overcoat are preferably selected from the group consisting of aluminium oxide, rare earth metal-stabilized aluminium oxide, rare earth metal sesquioxide, titanium dioxide, zirconium oxide, cerium-zirconium mixed oxide, vanadium pentoxide, vanadium trioxide, tungsten trioxide, molybdenum trioxide, and mixtures thereof. These oxides often form the basis for coatings which reduce the soot ignition temperature and/or for oxidatively catalytic or reductively catalytic coatings, which may be used to convert the pollutant gases carbon monoxide, residual hydrocarbons and nitrogen oxides, which are present in diesel exhaust gas in addition to diesel soot, into non-harmful components. Additional catalytic activation of the coating which reduces the depth filtration can therefore be achieved by admixing or impregnating oxidatively or reductively catalytic components and/or components which can reduce the soot ignition temperature.

The invention will be explained in more detail below on the basis of some figures and examples.

IN THE FIGURES

FIG. (1*a*) shows the view of the end surface with ducts alternatingly open (illustrated in white) and closed off in a gas-tight fashion (illustrated in black).

FIG. (1*b*) shows a detail of the wall-flow filter substrate in the form of a diagrammatic sketch showing its function; the following indications are used therein.

the arrows show the flow direction of the exhaust gas;
(1) inflow duct;
(2) outflow duct;
(3) gas-tight closure plug;
(4) porous, that is to say gas-permeable wall.

FIG. (2a) shows an enlarged detail of the wall of the wall-flow filter substrate with pores.

FIG. (2b) schematically shows the process of the depth filtration.

FIG. (2c) schematically shows the process of the filter cake formation.

EXAMPLE 1

Figure 7:
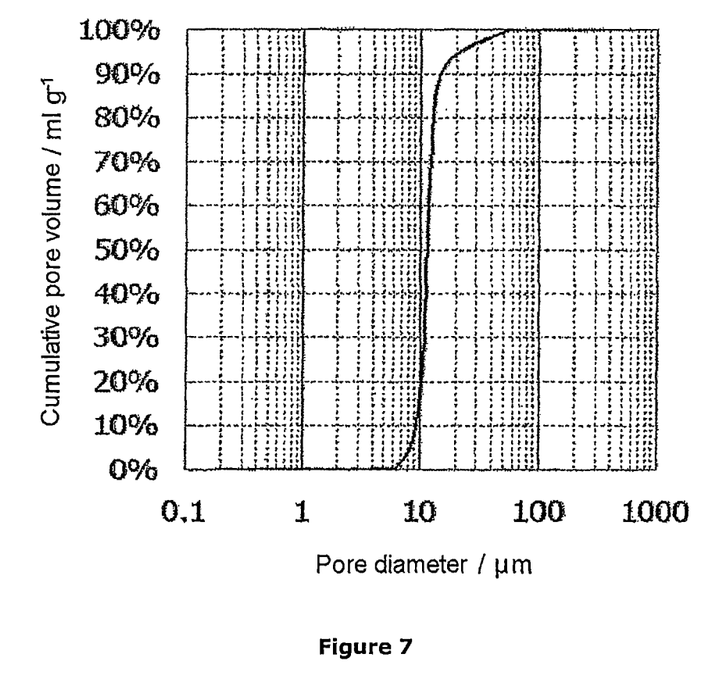
FIG. 7: shows a pore distribution, determined by mercury porosimetry, of the ceramic wall-flow filter substrate SD 031 from the company Ibiden plotted in single-logarithmic form.

A ceramic wall-flow filter substrate SD 031 from the company Ibiden, which had the pore distribution specified in FIG. 7 and a $d_{50}$ value of 10 µm, was provided with a coating composed of fibrous material with a high melting point.

For this purpose, a natural stone fibre material with a mean fibre length of 125 µm and a mean mass-based diameter of the fibres of 9 µm was suspended in water. After the addition of approximately 5 wt. % of silica sol ST-OUP from Nissan Chemical in relation to the total solid matter quantity, the suspension was pumped through the wall-flow filter substrate at the inflow duct side, wherein the suspension quantity contained precisely the total quantity of fibrous material to be applied, specifically 5 g/L in relation to the component volume. The component thus provided with a fibrous mat was dried at 120° C. by means of a heating fan and was subsequently calcinated, likewise by means of a heating fan, for a duration of one hour at 350° C.

The filter produced in this way exhibited a considerably reduced back pressure rise as a result of depth filtration in relation to the non-coated substrate, measured as a function of the soot loading quantity.

COMPARISON EXAMPLE

To produce catalytically coated diesel particle filters according to the prior art, two ceramic wall-flow filter substrates composed of aluminium titanate from the company Corning were provided with a coating composed of catalytically active material.

For this purpose, a powder containing high-grade metal was initially produced as a catalytically active component of the coating. To obtain said powder, a γ aluminium oxide stabilized with 3 wt. % lanthanum sesquioxide was impregnated with a mixture of an aqueous solution of a platinum precursor compound and an aqueous solution of a palladium precursor compound, wherein the total quantity of the aqueous solution with which the γ aluminium oxide was treated was selected such that the flowability of the powder was maintained. The moist powder resulting from the impregnation was dried over the period of 10 hours at 120° C. and was subsequently calcinated for four hours at 300° C. The finished powder containing high-grade metal contained 11 wt. % high-grade metal in relation to the total quantity of powder, with a platinum:palladium ratio of 2:1.

The thus-obtained catalytically active component of the coating was suspended, with stirring, in a quantity of water corresponding approximately to two and a half times the water absorption capacity of the powder. The suspension thus obtained was ground with the aid of a Dyno mill until the particle size distribution had a $d_{100}$ value of less than 7 µm.

After a suitable solid matter content of less than 20% was set, the suspension was introduced into the walls of the above-mentioned wall-flow filter substrate by being pumped into the ducts and subsequently being sucked out. The filters were subsequently dried by means of a heating fan at 120° C. and calcinated for a duration of four hours at 300° C. in a static furnace. The applied quantity of catalytically active coating in the finished diesel particle filters was approximately 28 g/L in relation to the volume of the component.

EXAMPLE 2

To produce a diesel particle filter according to the invention, one of the catalytically coated diesel particle filters obtained in the comparison example was provided with an oxidic overcoat.

Figure 8:
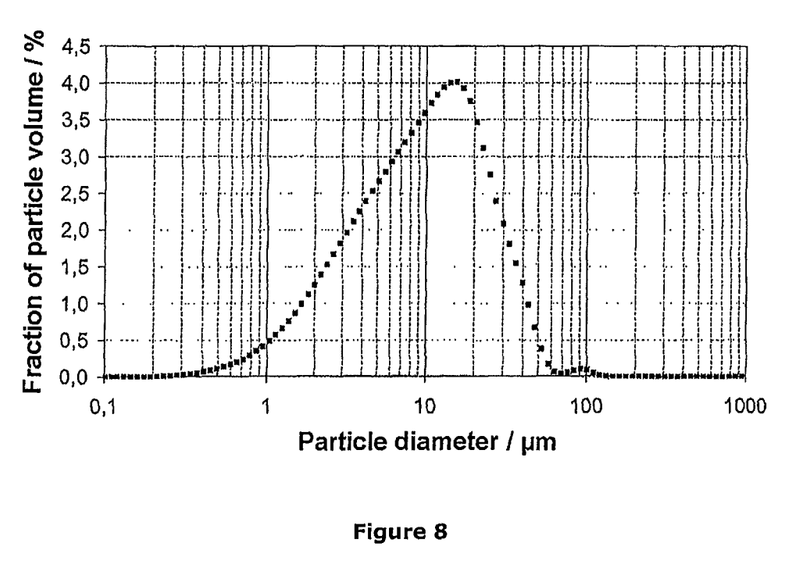
FIG. 8: shows the particle size distribution of the oxide for producing the oxidic overcoat from example 2 after grinding, plotted in single-logarithmic form.

To produce a suitable coating suspension for the overcoat, a suitable quantity of aluminium oxide stabilized with 3 wt. % lanthanum sesquioxide was suspended, with stirring, in a quantity of water corresponding approximately to two and a half times the water absorption capacity of the oxide used. The suspension obtained in this way was ground by means of a Dyno mill until the particle size distribution had a $d_{50}$ value of approximately 10 µm (precisely: 10.35 µm) and a $d_{90}$ value of approximately 30 µm (precisely: 29.48 µm). FIG. 8 shows the particle size distribution of the fully ground suspended oxide, measured using the LS230 particle size measuring unit from Beckman Coulter.

After a suitable solid matter content of approximately 18% was set, the suspension was applied to one of the already catalytically coated diesel particle filters from the comparison example by virtue of the coating suspension being pumped into the inflow ducts and subsequently being sucked out. The filter was subsequently dried by means of a heating fan at 120° C. and calcinated for a duration of four hours at 350° C. in a static furnace. The loading quantity attributable to the overcoat in the finished diesel particle filter was 5 g/L in relation to the volume of the component.

The back pressure characteristics under soot loading were tested by way of comparison in the catalytically coated diesel particle filter according to the prior art produced in the comparison example, and in the diesel particle filter according to the invention from example 2. The recording of the back pressure curves during the loading of the filter with soot was carried out by means of the "Diesel Particulate Generator" DPG from the company Cambustion, the measurement principles and methodology of which are familiar to a person skilled in the art, under the standard conditions recommended by the supplier of the unit.

Figure 9:
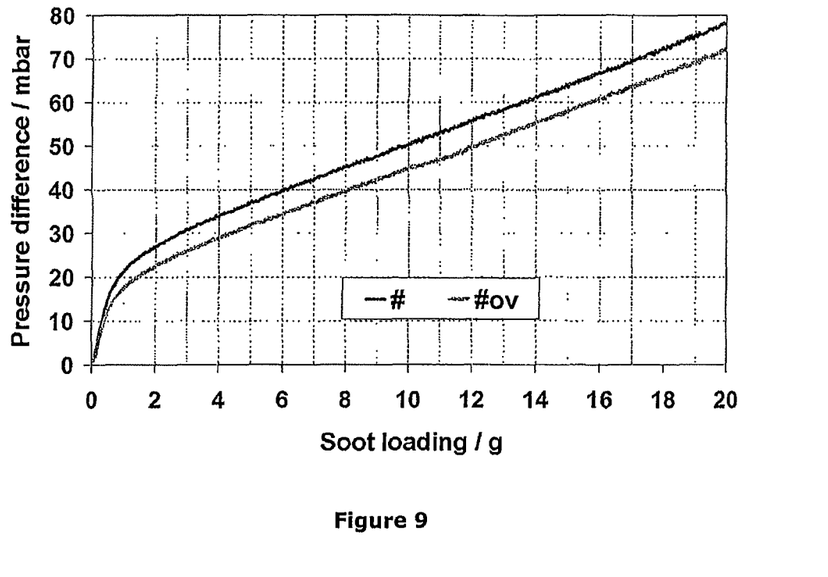
FIG. 9: shows a back pressure comparison measurement of the diesel particle filter without overcoat (#) from the comparison example and the diesel particle filter with overcoat (#ov) from example 2, with both measured curves having been corrected by subtraction of the axis intercept value, reduced by 1, of the curve for component # without an overcoat.

FIG. 9 shows the result of the comparative test of the back pressure as a function of the accommodated soot quantity. # denotes the diesel particle filter without an overcoat from the comparison example, #ov denotes the diesel particle filter with overcoat from example 2. In FIG. 9, both measured curves were corrected by subtraction of the axis intercept value, reduced by 1, of the curve for component # without an overcoat, in order to show the direct influence of the overcoat.

It can be clearly seen that, proceeding from the same initial back pressure, the filter with an overcoat #ov exhibits a considerably smaller increase in that region of the back pressure curve which can be attributed to the depth filtration. The observed back pressure difference between the diesel particle with an overcoat and the diesel particle filter without an overcoat is approximately 6 mbar.

The invention claimed is:

1. A diesel particle filter comprising a ceramic wall-flow filter substrate and a coating applied in the inflow ducts, wherein
    the wall-flow filter substrate comprises inflow ducts, outflow ducts, and walls between the inflow ducts and the outflow ducts,
    the walls comprise pores that connect the inflow ducts and outflow ducts,
    the coating comprises material with a high melting point and has a solid matter loading of 1-50 g/L in relation to the volume of the wall-flow filter substrate,
    the coating is present in a manner that closes off pores that connect the inflow ducts and outflow ducts in a manner that inhibits the passage of soot particles at the inflow side without preventing the passage of gaseous exhaust-gas constituents, and
    the material of the coating predominantly contains one or more oxides which have a high melting point and the particle sizes of which are adapted to the pore sizes in the wall of the wall-flow filter substrate in such a way that the $d_{50}$ value of the particle size distribution of the one or more oxides is equal to or greater than the $d_5$ value of the pore size distribution of the wall-flow filter substrate, wherein
    the $d_{50}$ value of the particle size distribution of the one or more oxides means that 50% of the total volume of the one or more oxides contains only particles whose diameters are less than or equal to the value specified as $d_{50}$, and
    the $d_5$ value of the pore size distribution of the wall-flow filter substrate means that 5% of the total pore volume determinable by mercury porosimetry is formed by pores whose diameters are less than or equal to the value specified as $d_5$.

2. The diesel particle filter according to claim 1, wherein the particle sizes of the one or more oxides of the material of the coating are adapted to the pore sizes in the wall of the wall-flow filter substrate in such a way that the $d_{90}$ value of the particle size distribution of the one or more oxides is equal to or greater than the $d_{95}$ value of the pore size distribution of the wall-flow filter substrate, wherein
    the $d_{90}$ value of the particle size distribution of the one or more oxides means that 90% of the total volume of the one or more oxides contains only particles whose diameters are less than or equal to the value specified as $d_{90}$, and
    the $d_{95}$ value of the pore size distribution of the wall-flow filter substrate means that 95% of the total pore volume determinable by mercury porosimetry is formed by pores whose diameters are less than or equal to the value specified as $d_{95}$.

3. The diesel particle filter according to claim 2, wherein the one or more oxides have a particle size distribution with a $d_{50}$ value of greater than or equal to 5 µm and with a $d_{90}$ value of greater than or equal to 20 µm.

4. The diesel particle filter according to claim 3, wherein the one or more oxides are selected from the group consisting of aluminium oxide, rare earth metal-stabilized aluminium oxide, rare earth metal sesquioxide, titanium dioxide, zirconium oxide, cerium-zirconium mixed oxide, vanadium pentoxide, vanadium trioxide, tungsten trioxide, molybdenum trioxide, and mixtures thereof.

5. The diesel particle filter according to claim 4, wherein the coating has a layer thickness of 10 to 150 µm.

6. The diesel particle filter according to claim 1, wherein the coating predominantly contains a fibrous material with a high melting point, with the mean length of the fibres being between 50 and 250 µm and with the mean mass-based diameter of the fibres being equal to or less than the $d_{50}$ value of the pore size distribution of the wall-flow filter substrate, and
the $d_{50}$ value of the pore size distribution of the wall-flow filter substrate means that 50% of the total pore volume determinable by mercury porosimetry is formed by pores whose diameters are less than or equal to the values specified as $d_{50}$.

7. The diesel particle filter according to claim 6, wherein the fibrous material is selected from the group consisting of rockwool, natural stone fibre, and mineral wool, and
the selected fibrous material comprises fibre diameters of greater than 5 µm.

8. The diesel particle filter according to claim 7, wherein the coating has a layer thickness of 1 to 50 µm.

9. The diesel particle filter according to claim 1, wherein the wall-flow filter substrate is produced from silicon carbide, cordierite, or aluminium titanate, and the pores present in the walls between the inflow ducts and outflow ducts have a mean diameter of between 5 and 50 µm.

10. The diesel particle filter according to claim 9, wherein the wall-flow filter substrate comprises one or both of a further catalytically active coating and a further coating which reduces the soot ignition temperature, and
the one or both further coatings is present predominantly in the pores of the wall between the inflow ducts and outflow ducts.

11. The diesel particle filter according to claim 9, wherein one or both of an additional catalytically active coating and an additional coating which reduces the soot ignition temperature is applied to the coating in the inflow ducts comprising the material with the high melting point.

12. The diesel particle filter according to claim 1, wherein one or both of oxidatively catalytic or reductively catalytic components and components which can reduce the soot ignition temperature are present with the coating which predominantly contains one or more oxides which have high melting point, and
the one or both components are present by admixture or impregnation with the coating comprising the material having the high melting point.

13. The diesel particle filter according to claim 1, wherein the coating comprises a solid matter loading of 1-20 g/L in relation to the volume of the wall-flow filter substrate.

14. A method of manufacturing the diesel particle filter of claim 1, comprising
applying the coating in the inflow ducts of the wall-flow substrate.

15. The method according to claim 14, wherein
the particle sizes of the one or more oxides of the material of the coating are adapted to the pore sizes in the wall of the wall-flow filter substrate in such a way that the $d_{90}$ value of the particle size distribution of the one or more oxides is equal to or greater than the $d_{95}$ value of the pore size distribution of the wall-flow filter substrate, wherein
the $d_{90}$ value of the particle size distribution of the one or more oxides means that 90% of the total volume of the one or more oxides contains only particles whose diameters are less than or equal to the value specified as $d_{90}$, and
the $d_{95}$ value of the pore size distribution of the wall-flow filter substrate means that 95% of the total pore volume determinable by mercury porosimetry is formed by pores whose diameters are less than or equal to the value specified as $d_{95}$.

16. The method according to claim 15, wherein
the one or more oxides have a particle size distribution with a $d_{50}$ value of greater than or equal to 5 µm and with a $d_{90}$ value of greater than or equal to 20 µm.

17. The method according to claim 14, wherein
the coating is applied to have a layer thickness of 10 to 150 µm.

18. The method according to claim 14, wherein
the coating predominantly contains a fibrous material with a high melting point, with the mean length of the fibres being between 50 and 250 µm and with the mean mass-based diameter of the fibres being equal to or less than the $d_{50}$ value of the pore size distribution of the wall-flow filter substrate.

19. The method according to claim 14, wherein
applying the coating comprising material with the high melting point includes applying the coating to a wall-flow filter substrate that comprises one or both of a further catalytically active coating and a further coating which reduces the soot ignition temperature, with the one or both further coatings being present predominantly in the pores of the walls between inflow ducts and outflow ducts, or
applying the coating comprising material with the high melting point includes also applying one or both of a catalytically active component and a component that reduces the soot ignition temperature, with the one or both components being either: applied as an additional coating over the coating comprising material with the high melting point; or present in the coating comprising the material having the high melting point by admixture or impregnation.

20. The method according to claim 14, wherein
the coating comprises a solid matter loading of 1-20 g/L in relation to the volume of the wall-flow filter substrate.

21. A diesel particle filter comprising a ceramic wall-flow filter substrate and a coating applied in the inflow ducts, wherein
the wall-flow filter substrate comprises inflow ducts, outflow ducts, and walls between the inflow ducts and the outflow ducts,
the walls comprise pores that connect the inflow ducts and outflow ducts,
the coating comprises material with a high melting point and has a solid matter loading of 1-50 g/L in relation to the volume of the wall-flow filter substrate,
the coating is present in a manner that closes off pores that connect the inflow ducts and outflow ducts in a manner that inhibits the passage of soot particles at the inflow side without preventing the passage of gaseous exhaust-gas constituents, and
the material of the coating predominantly contains one or more oxides which have a high melting point and the particle sizes of which are adapted to the pore sizes in the wall of the wall-flow filter substrate in such a way that the $d_{90}$ value of the particle size distribution of the one or more oxides is equal to or greater than the $d_{95}$ value of the pore size distribution of the wall-flow filter substrate, wherein
the $d_{90}$ value of the particle size distribution of the one or more oxides means that 90% of the total volume of the one or more oxides contains only particles whose diameters are less than or equal to the value specified as $d_{90}$, and
the $d_{95}$ value of the pore size distribution of the wall-flow filter substrate means that 95% of the total pore volume determinable by mercury porosimetry is formed by pores whose diameters are less than or equal to the value specified as $d_{95}$.

22. A method of manufacturing the diesel particle filter of claim 21, comprising
applying the coating in the inflow ducts of the wall-flow substrate.

* * * * *

UNITED STATES PATENT AND TRADEMARK OFFICE
CERTIFICATE OF CORRECTION

| | | |
|---|---|---|
| PATENT NO. | : 9,051,857 B2 | Page 1 of 1 |
| APPLICATION NO. | : 13/127326 | |
| DATED | : June 9, 2015 | |
| INVENTOR(S) | : Franz Dornhaus et al. | |

It is certified that error appears in the above-identified patent and that said Letters Patent is hereby corrected as shown below:

Title Page

Item [73], Assignees, change "UNICORE AG & CO. KG" to -- UMICORE AG & CO. KG --

Signed and Sealed this
Sixth Day of October, 2015

Michelle K. Lee
*Director of the United States Patent and Trademark Office*